United States Patent Office 3,506,453
Patented Apr. 14, 1970

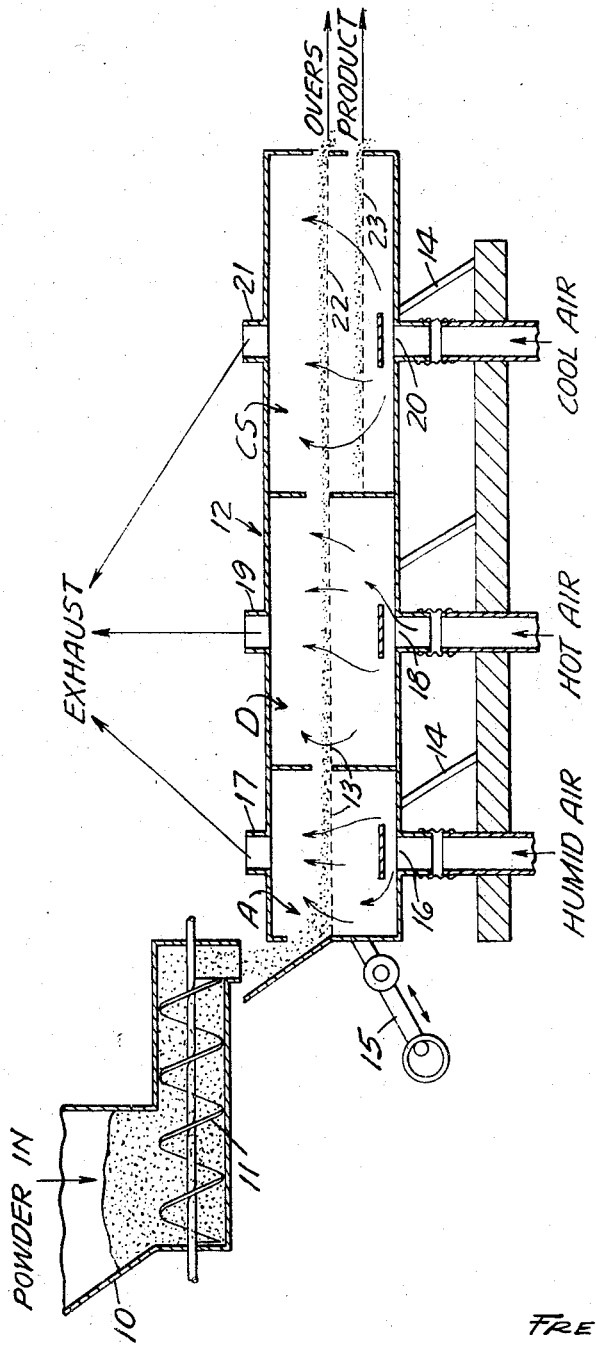

3,506,453
AGGLOMERATED FUMARIC ACID COMPOSITION
Fred H. McCarron, Minneapolis, Minn., assignor to The Pillsbury Company, Minneapolis, Minn., a corporation of Delaware
Filed Nov. 14, 1966, Ser. No. 594,222
Int. Cl. A23l 1/00
U.S. Cl. 99—78                                     17 Claims

ABSTRACT OF THE DISCLOSURE

Cold water-soluble, low caloric aggregates suitable for use in fruit flavored beverages are provided by agglomerating citric acid particles, synthetic sweetener and fumaric acid particles. The fumaric acid particles utilized in preparing the aggregates have a particle size of less than 75 microns and are coated with a dialkyl ester of sodium sulfosuccinate.

---

This invention relates to dry mixes from which acidulent drink type beverages can be prepared and the method of preparation thereof. More particularly, the present invention relates to an agglomerated fumaric acid composition and the method for preparing the same.

Conventionally, fruit flavored, dietetic beverage dry mixes are prepared mechanically by blending the dry mix ingredients together. Heretofore, considerable difficulties have been encountered in maintaining mix homogeneity. During transit, mechanical mixes tend to separate into various mix ingredients. A nonhomogenous mix adversely effects the quality of the reconstituted beverage mix.

U.S. Patent No. 3,100,909 by A. Schapiro discloses an agglomerated, dietetic, soft drink beverage which in addition to citric acid, sodium cyclamate and saccharin, contains binding agents such as sugars, dextrin gum, corn syrup solids, etc. Both solubility and nonsegregation of the various mix ingredients are enhanced thereby. The presence of the binding agents, however, increases the caloric content of the beverage mix.

The drawing is a diagrammatical vertical section taken longitudinally of the flow materials conducted in a suitable apparatus for practicing the invention.

An object of the present invention is to provide an agglomerated fumaric acid composition which readily dissolves in water.

Another object of the invention is to provide a method for agglomerating fumaric acid.

An additional object of the invention is to provide a nonseparable, agglomerated beverage mix.

According to the present invention, there is provided as an article of manufacture an edible, porous, cold water-soluble aggregate composition consisting essentially of fumaric acid particles having a maximum particle size of less than 75 microns, said fumaric acid particles having an interjacent phase of a dialkyl ester of a sodium sulfosuccinate wherein the dialkyl groups contain from 7 to 14 carbon atoms inclusive and citric acid particles, said fumaric acid and said citric acid particles being adhered together in a random fashion and an artificial sweetener homogenously dispersed within the aggregate, said aggregate containing from 1 to about 9 parts by weight fumaric acid particles per 3 parts by weight citric acid and the interjacent phase ranging from about 0.001 to about 0.01 part by weight per part of fumaric acid.

The aggregates of the instant invention are prepared by forming a mixture of from about 1 to about 9 parts by weight fumaric acid particles having a particle size of 75 microns and coated with between about 0.001 and about 0.01 part by weight per part by weight fumaric acid of a dialkyl ester of a sodium sulfosuccinate having dialkyl groups of 7 to 14 carbon atoms inclusive, citric acid particles in an amount of 3 parts by weight and an artificial sweetener, and converting the mixture to the form of porous aggregate in which the artificial sweetener is homogenously dispersed.

The porous aggregate comprising fumaric and citric acid particles are firmly bonded together in random fashion. The instant aggregates are inherently resistant to mechanical segregation into layers of particles of differing sizes and densities during storage and other handling. Moreover, the aggregates are free flowing and substantially nonhygroscopic in nature. Upon reconstitution of the aggregates in an aqueous medium, the aggregates readily disperse therein to provide a homogenous beverage mix. Necessity for additional bonding agents which would increase the caloric content thereof such as starch, sugars, corn syrup solids, dextrin gums and the like is obviated by the instant aggregates.

Since the fumaric acid particles, including the disclosed dialkyl esters of sodium sulfosuccinate fumaric acid particles are substantially nonagglomerable, it was believed that the addition of the fumaric acid particles to citric acid particles would decrease the agglomerability thereof in proportion to the amount of added fumaric acid particles. Unexpectedly, it was observed that the combination of disclosed citric acid and fumaric acid particles agglomerated more readily than when only citric acid was employed. In comparison to agglomerates wherein citric acid particles were employed, the resultant combination of ingredients provided a superior agglomerate. Moreover, when using the apparatus disclosed in U.S. Patent No. 3,220,054 by R. G. Gidlow, it was found that screen fouling was markedly decreased by employing the combination of amounts of acidulents herein disclosed instead of using citric acid alone as the acidulent.

Suitable fumaric particles and the manner of preparing said particles are disclosed in U.S. Patent No. 3,151,986 by J. H. Van Ness. Typical dialkyl esters of sodium sulfosuccinate coatings include di-(2-ethylhexyl)-sodium sulfosuccinate,
di-(n-dodecyl)-sodium sulfosuccinate,
di-(n-octyl)-sodium sulfosuccinate,
mono-2-ethylhexyl,
mono-1-methyl-4-ethylhexyl sodium sulfosuccinate,
dimyristate sodium sulfosuccinate,
di-(1-methyl-4-ethyloctyl) sec-sodium sulfosuccinate,
di-(n-heptyl)-sodium sulfosuccinate,
di-(1-methyl-4-ethylhexyl) sec-sodium sulfosuccinate,
di-(1-butylamyl) sec-sodium sulfosuccinate,
mono-2-ethylhexyl,
mono-1-methylheptyl sodium sulfosuccinate, mixtures thereof and the like. Average particle size of the fumaric acid particles ranges from 20 to 75 microns.

The amount of fumaric acid based upon 3 parts by weight citric acid ranges from 1 to about 9 parts by weight. It has been found that greater amounts of fumaric acid are relatively unagglomerable with concomitant mechanical segregation of the particulate ingredients resulting therefrom. Lesser amounts of fumaric acid result in screen fouling during processing and greater hygroscopicity and segregation in the resultant product. From about 4 to about 6 parts by weight fumaric acid particulates per 5 parts by weight citric acid will provide excellent agglomeration and aggregate characteristics.

In order to impart sweetness to the aggregates of the present invention, a nonsugar type sweetening agent (i.e., sweeteners which possess no more than 1 hydroxyl group) is homogenously distributed therein. Illustrative artificial sweetening agents are the edible saccharins and edible cyclamic acid compounds, mixtures thereof and the like. Typical saccharin artificial sweeteners are saccharin and salts thereof such as sodium saccharin, potassium saccharin and calcium saccharin. Cyclamic acid sweeteners include cyclohexylsulfamic acid, the salts thereof such as sodium, potassium, calcium and ammonium cyclamate, the lower alkyl glycine esters of cyclohexylsulfamic acid such as glycine methyl ester cyclohexylsulfamate, glycine ethyl ester cyclohexylsulfamate, glycine octyl ester cyclohexylsulfamate, etc. The amount of artificial sweetener added during processing and resulting in the aggregate product will depend upon the level of sweetness desired in the ultimate product as well as the sweetening power of the artificial sweetening agent employed.

Other drink mix ingredients which are normally added in relatively small amounts such as dry beverage fruit flavoring agents (e.g., the natural and artificial aromatic essence flavoring agents such as raspberry, cherry, blackberry, grape, strawberry, peach, pineapple, apple, etc.) and coloring agents (e.g., FDC Blue No. 1, Red No. 2, Yellow Nos. 5 and 6, etc.) are homogeneously distributed or mixed with the artificial sweetening agents, fumaric and citric acid particles prior to the conversion thereof to the aggregate form. If desired, clouding agents, preservatives, gums (e.g., carboxymethylcellulose, guar gum, methylethylcellulose, etc.), antioxidants, buffering agents, nutritional additives (e.g., vitamins) other acidulents (e.g., adipic malic, tartaric acids) in minor amounts less than 18 percent by weight and the like conventionally added to dry beverage mixes are preferably homogeneously mixed with the remaining beverage mix ingredients prior to the agglomeration thereof.

The components of the aggregates are provided in a finely divided state or reduced to powder prior to the conversion thereof to the instant porous aggregates. Particle size of the coated fumaric acid particles as hereinbefore described generally ranges from 20 to 75 microns. The citric acid particles should not be excessively large in size (e.g., larger than 100 microns). Proper surface tackiness and aggregate homogeity is achieved, for example, by employing citric acid particles having a size less than 80 microns. Preferably employed are citric acid particles of less than 80 microns with at least 50 percent by weight thereof having a particle size of less than 10 microns. The best results are achieved when anhydrous citric acid is used. Citric acid hydrate goes into solution so readily when moistened in an agglomeration system such as herein described that it is very difficult to control the moistness and prevent complete dissolution of the citric acid, thereby making it difficult to successfully agglomerate the product.

The particle size of the other aggregate components prior to agglomeration such as the artificial sweetening, coloring and flavoring agents and the like may range from about 1 micron to about 250 microns. Preferably, the other aggregate component particles range in size from about 20 microns to about 100 microns. By employing the preferred level, more uniform distribution and nonsegregation of the other components are provided. Although the other components can be obtained in a powdered form commercially, they can, if desired, be ground in any suitable comminuting device such as a "No. 4 TH Micro Pulverizer" type grinder set to run at 1800 r.p.m. with a 0.046 inch herringbone type screen.

Broadly speaking, the method of this invention comprises providing the ingredients of the beverage mix in a fine pulverulent form (as by grinding) and thoroughly admixing these ingredients to provide a uniform homogenous mixture thereof. If the flavoring is in the form of tiny capsules (e.g., flavors in an encapsulating matrix), these capsules are not subjected to any grinding or other reducing step. Similarly, the coated fumaric acid particles are not ground since grinding would destroy the coating thereon. Once the ingredients have been uniformly mixed, they are wetted with enough liquid (preferably water) to wet the citric acid and fumaric acid particles to a degree sufficient to cause the surfaces thereof to become tacky and adhesive. The liquid is preferably a solvent which dissolves a portion of the particles on which it is deposited and forms an adhesive solution on the surface thereof which serves to bond the particles together in the form of porous agglomerates. Although water is the preferred solvent, other suitable solvents can be used if desired.

The wetted particles are then brought into contact with one another whereby they stick together in clusters and form the desired porous agglomerated product.

The most successful agglomeration of this low calorie beverage mix is accomplished by limiting the amount of moisture increase or the amount added to a maximum limit of about 3.5 percent. If the material is overmoistened, too much thereof goes into solution, making it difficult if not impossible to form porous agglomerates. Excess solution also tends to foul the agglomerating equipment and to fill the spaces between whatever particles remain, thereby reducing or destroying the porosity of the product. The increase in moisture content falls within a preferred range of about 0.5 to about 3.5 percent. Thus, it is desirable to retain as much as possible the physical particulate entity during the wetting and agglomeration thereof.

The addition of moisture is preferably achieved while the particles are in a densely-dispersed, agitated condition such as is provided on the apparatus hereinafter to be described, with the moisture and particles being thoroughly intermixed so that the particles of the mixture are uniformly moistened.

The addition of moisture is preferably accomplished by condensation, as this method provides the best manner of controlling the degree and uniformity of added moisture. We have also found that best results are obtained by carefully controlling the condensation conditions, which can be expressed by the relation between the temperature of the dry material fed to the humid atmosphere of the agglomerator and the wet and dry bulb temperature of said humid atmosphere from whence the agglomerating liquid comes. We have found it desirable to limit feed temperature of the material to a maximum of about 120° F., with the temperature preferably not substantially higher than 100° F. and most preferably about 80° F. The humid atmosphere preferably has a dry bulb temperature not substantially lower than 255° F., with a range of 255° to 275° F. considered desirable. The wet bulb temperature of the humid air should not substantially exceed 170° F., with a wet bulb temperature of 155° to 165° F. being a desirable range when the feed temperature of the mixture is about 80° F. lower wet bulb temperatures can be used with lower feed temperatures. Any combination of feed temperature and wet and dry bulb temperatures which will produce substantially the same results and degree of added moisture as that produced by a feed temperature of 80° F., a dry bulb temperature of 255° to 275° F., and a wet bulb temperature of 55° to 65° F. is considered to be within the scope of this invention.

The condensed moisture forms an adhesive surface on the particles. The wetted particles are then brought into random contact whereby they form wet, porous aggregates.

After the wet, porous aggregates have been formed, they are preferably almost immediately subjected to a drying operation to remove all or a major portion of the added moisture therefrom. The starting material usually contains not more than 4 percent total moisture, and preferably only 2 to 3 percent and the aggregate product is preferably dried back to within ½ percent plus or minus of the original moisture content.

Reference is now made to the accompanying drawing for a more detailed description of one preferred means of carrying out our invention. The illustrated apparatus and method of agglomerating a product thereon is disclosed and discussed in more detail in U.S. Patent No. 2,995,773. The agglomeration apparatus illustrated includes a feed hopper 10 which serves as a source of dry beverage mix starting material to be agglomerated, which material is of the requisite degree of fineness. The material to be agglomerated is drawn from the hopper 10 into the screw type conveyor 11 which continuously feeds the fine particulate material into the elongated agglomerator structure 12. The agglomerator has a perforated or foraminous screen 13 extending longitudinally thereof upon which the starting material is initially deposited and across which it travels from the inlet towards the discharge end and in the course of the travel thereover is converted into the desired agglomerated end product.

The agglomerator, in the form shown, is divided into a longitudinal series of adjacent operational compartments successively labeled A, D and CS and in which the agglomerating, drying and cooling and sizing respectively take place. The agglomerator illustrated is also provided with a means for transporting the bed of material through the agglomerator. This includes means for vibrating the entire agglomerator structure 12 to provide the generally forward motion of the bed of material passing therethrough, which vibrating means includes the supporting rocker arms 14 and the eccentric drive pitman 15 and suitable drive means therefor. As the material travels over the perforated screen 13, it is maintained in a dispersed, agitated substantially fluidized condition by a stream of humid air or water vapor such as steam which is constantly injected into the lower portion of the first compartment or agglomerating section A through the port 16 and passes upwardly through the screen 13 and the bed of material at a velocity sufficient to maintain the particulate bed in a substantially fluidized state with a high particle-vapor ratio, and the particles in close, relatively dense, agitated proximity, and after passing through the bed of material is removed through a suitable discharge or exhaust port 17 provided on top of the agglomerator.

To avoid excessive fouling of the screen 13 by the wetted adhesive particles, the screen may be of the endless continually moving type which continuously leaves and returns to the agglomerating section A, with means provided for cleaning that portion of the screen removed from the agglomerating compartment between its removal therefrom and its re-entry thereto, or the fluidizing vapor gas may be superheated so that the particles adjacent the screen absorb the superheat without condensation and without becoming sticky, while the particles in the upper strata of the bed of material in compartment A and out of contact with the screen have the moisture condensed thereon as set forth in the aforementioned patent.

After the agglomeration or aggregate formation of the material in the agglomerating compartment A due to the formation of adhesive surfaces on the particles by the condensation of the water vapor on the particles and the bringing together of the adhesive particles by the general agitation and mild turbulence of the bed provided by its fluidized nature and the vibration of the agglomerator, the agglomerated material passes to the next stage or compartment D in which the added moisture is removed and the material is dried by means of a current of warm air passing constantly through the screen 13 in the bed of agglomerates, the stream of hot air entering the bottom of compartment D through duct 18 and exhausting therefrom through the exhaust opening 19 in the roof. Drying air having a temperature of about 250° F. is desirable. However, considerable latitude is permissible in the drying temperature. The drying of the aggregate strengthens and rigidifies them and removes the stickiness therefrom to enable them to be handled, packaged, stored and transported. After drying, the warm, dried aggregates pass to the next or final stage or compartment CS in which the aggregates are optionally subjected to a stream or cooling air entering from duct 20 and exhausting through duct openings 21 in the roof to cool the aggregates to room temperature and place them in a rigid state.

In the last compartment CS the aggregates are also classified while being cooled. The hot, dried aggregates pass from the screen 13 onto a coarser classifying screen 22, the product falling through the screen 22 onto the finer collection screen 23 therebelow, the oversized material remaining on the screen 22, the product and oversized material being discharged as indicated.

Thus, the material to be aggregated is introduced into a warmer atmosphere of humid air or steam which is partially or nearly saturated with water vapor and therefore condensation occurs on the surface of the particles forming a sticky, tacky adhesive surface thereon. Due to the agitation and proximity of the particles in the agglomerating chamber, the particles comprising the mixture stick to one another when making contact with each other to progressively build up soft aggregates which are characterized by the proportionately large number of voids and interstices extending therethrough providing ready access to substantially all of the particles forming the agglomerates which quickly disperse and dissolve in a liquid. The aggregates are then subjected to conditions which cause drying and the removal of the added moisture resulting in hardening or firming of the aggregates.

The low calorie beverage aggregates of this invention are very porous and characterized by the multitude of fine particles in each agglomerate which are randomly bonded together at their interstices by the citric acid which functions as the bonding agent, the particles defining a large number of voids or interstices which form a network of passages through the aggregate to enable a liquid to quickly penetrate the aggregate interior and rapidly reach all of the particles comprising the aggregates and break the bond holding individual particles together and disperse them in the liquid for quick (virtually instant) dispersion and dissolution without any lumping into difficult to penetrate balls or masses in the liquid. The aggregates of this invention are further characterized by being free flowing and noncaking, even under severe at mospheric conditions involving significant changes in humidity. Thus, by grouping large numbers of these very fine pulverized particles together into larger porous aggregates, we obtain the advantage of fine, individual particle size for maximum rate of solution and the advantage of the larger size agglomerates which provide the free-flowing, noncaking characteristics.

The aggregate product of this invention has a bulk density which is lower than that of the starting material, is substantially dustless and the aggregates are friable yet strong enough to resist breaking down and pulverizing or powdering when subjected to the rigors of handling, shipping and storing.

The lower bulk density of the aggregate product is of particular advantage in this type of product. The dry mix is usually packaged in amounts sufficient to make one or two quarts of the desired beverage. Since only a very small amount of mix is needed to make one or two quarts of beverage (5 to 7 grams for 2 quarts), only a minute sized package is actually needed to house the volume of mix. However, for convenience of handling, display, etc., a package considerably larger than the minimum required is actualy used, resulting in a considerable amount of excess space in each package. The lower bulk density product enables this small amount of mix to occupy more space and thereby better fill these packets. Also, the aggregate form better assures complete emptying of the contents from the package. Portions of conventional unaggregated powdered mix tend to remain in the corners of the package and get thrown away, rather than used, or at least make the complete emptying of the package more difficult.

The unaggregated dry mixture from which the aggregate product is formed is a pale color which is only vaguely reminiscent of the natural fruit which corresponds to the flavoring. This is because in the unagglomerated form, the coloring in the physical admixture of ingredients is of such a small amount that it is diluted and disguised by the much larger quantities of the other ingredients.

The aggregate product is much darker and deeper than the unagglomerated or nonaggregate material. The color of the aggregate material is very similar in color to and much more suggestive of the natural fruit of the flavoring of the mix and to the actual color that the drink will be when reconstituted in water than the unagglomerated material. This more uniform and intense coloring of the material takes place when the particles are wetted during the agglomeration operation. The wetting of the coloring and the intimate relationship of the agitated, wetted particles causes the coloring to be spread uniformly over virtually all the particles comprising the mix. The aggregate product is easy to measure at high speed and with a high degree of accuracy, which is particularly important during the packaging thereof. It disperses and dissolves almost instantly when added to a liquid.

An illustrative, porous aggregate composition drink mix consists essentially of the folowing ingredients and amounts thereof:

| Ingredients: | Parts by weight |
| --- | --- |
| Cyclamate salts (e.g., calcium cyclamate) | 65–125 |
| Anhydrous citric acid | 90 |
| Coated fumaric acid particles [1] | 60–135 |
| Saccharin salt (e.g. calcium saccharin) | 5–12 |
| Flavoring agent | 2.5–25 |
| Coloring agent | .01–5 |

[1] Coated with 0.5 percent by weight di-(2-ethylhexyl)-sodium sulfosuccinate as prepared in U.S. Patent No. 3,151,986.

The following are a few illustrative examples of typical drink mix formulations according to this invention:

EXAMPLE I

Raspberry

| Ingredient: | Percent by weight |
| --- | --- |
| Anhydrous citric acid | 28 |
| Calcium cyclamate | 32 |
| Coated fumaric acid particles[1] | 28 |
| Calcium saccharin | 3 |
| Raspberry flavoring | 1.5 |
| Sodium citrate | 7 |
| Coloring (FD&C—certified food coloring): | |
| Red #2 | .496 |
| Blue #1 | .004 |
| | .5 |
| | 100 |

EXAMPLE II

Orange

| Ingredient: | Percent by weight |
| --- | --- |
| Anhydrous citric acid | 39 |
| Calcium cyclamate | 28 |
| Coated fumaric acid[1] | 26 |
| Calcium saccharin | 2.5 |
| Orange flavoring | 2.5 |
| Coloring (FD&C—certified food coloring): | |
| Yellow #6 | 1.963 |
| Red #2 | .037 |
| | 2 |
| | 100 |

EXAMPLE III

Grape

| Ingredient: | Percent by weight |
| --- | --- |
| Coated fumaric acid[1] | 33 |
| Anhydrous citric acid | 22 |
| Calcium cyclamate | 32 |
| Calcium saccharin | 2.7 |
| Grape flavoring | 1.6 |
| Sodium citrate | 7.82 |
| Coloring (FD&C—certified food coloring): | |
| Red #2 | .80 |
| Blue #1 | .08 |
| | .88 |
| | 100 |

[1] Coated with 0.5 percent by weight di-(2-ethylhexyl)-sodium sulfosuccinate as prepared in U.S. Patent No. 3,151,986.

In Examples I to III, all of the ingredients excepting the flavoring and fumaric acid were physically mixed and then ground to a fine pulverulent form in a Micro Pulverizer Model No. TH manufactured by the Pulverizing Machinery Division of Slick Industrial Company of Summit, N.J.; said Micro Pulverizer Model TH being equipped with a 0.046 herringbone screen with a rotor turning at 1800 r.p.m. The micro-pulverized particles, coated fumaric acid and flavoring agent were then blended in a ribbon mixer.

The anhydrous citric acid particle size was such that substantially all the citric acid particles were less than 80 microns with at least a major portion thereof being less than 10 microns. Fumaric acid average particle size was within the range of 20 to 75 microns.

The blended ingredients were then agglomerated on a vibratory agglomerator similar to that illustrated. This agglomerator was 6 inches wide and had an agglomerating section 18 inches long. Humid air was passed through the agglomerating section at a rate of 200 feet vertical superficial velocity, this air having a wet bulb temperature of 165° F. and a dry bulb temperature of 275° F. The agglomerating section was vibrated with an amplitude of ½ inch at 700 cycles per minute directed at a 45 degree angle with the horizontal in the direction of travel. The material was fed at 80° F. into the agglomerator at a free feed rate of 300 pounds per hour. The wet agglomerates were dried in the drying section with drying air having a dry bulb temperature of 250° F., which air was passed through the drying section at a rate of 100 feet vertical superficial velocity.

The agglomerated mixes of Examples I to III had a bulk density of about 18 to 22 pounds per cubic foot. In contrast, the powdered starting material from which the aforementioned agglomerated product was formed has a bulk density of about 37 pounds per cubic foot. The same material in conventional unagglomerated form which includes a bulking agent (mannitol) has a bulk density of about 34 pounds per cubic foot. Thus, it will be appreciated that the agglomerated product has bulk volume almost twice that of the conventional unagglomerated mix, with the aforementioned advantages associated therewith.

Insofar as the rate of solution is concerned, the agglomerated low calorie mixes dissolve in a matter of a few seconds (virtually instantly) upon addition to water, even cold water, without requiring any mixing to obtain the desired dispersion and dissolution. In contrast, the conventional unagglomerated mixes require vigorous stirring to break up the lumps and masses which naturally form and get the material into solution. Even with vigorous stirring, it usually takes a minute or more to dissolve all the conventional material.

The resulting aggregates were firm and resistant toward mechanical segregation when subjected to a testing via a conventional jolting apparatus. Hygroscopicity of the resulting aggregates was less than that of aggregate compositions containing citric acid as the sole acid ingredient.

Excessive screen fouling resulted when a weight ratio of citric acid to fumaric acid of less than 3:1 was employed.

What is claimed is:

1. An edible, porous, cold water-soluble aggregate composition consisting essentially of fumaric acid particles, citric acid particles and an artificial sweetening agent homogeneously dispersed within the aggregate composition, said fumaric acid particles having a maximum particle size ranging from about 20 to less than 75 microns and an interjacent phase of dialkyl ester of a sodium sulfosuccinate wherein the dialkyl groups contain from 7 to 14 carbon atoms inclusive, said fumaric acid particles and said citric acid particles being adhered together in a random fashion, said aggregate containing from at least 1 to about 9 parts by weight fumaric acid particles, 3 parts by weight citric acid and from about 0.001 to about 0.01 part by weight dialkyl ester of sodium sulfosuccinate per part by weight of fumaric acid.

2. The aggregate composition according to claim 1 wherein substantially all the citric acid particles have a particle size less than 80 microns with at least a major portion of said citric acid particles being less than 10 microns in size.

3. The aggregate composition according to claim 2 wherein the interjacent phase is a dioctyl ester of sodium sulfosuccinate.

4. The aggregate composition according to claim 3 wherein the aggregates have from about 2.5 to about 25 parts by weight of a flavoring agent uniformly distributed therein.

5. The aggregate according to claim 4 which contains a coloring agent in an amount from about 0.01 to about 5 parts by weight and the dioctyl ester of sodium sulfosuccinate is di-(2-ethylhexyl)-sodium sulfosuccinate.

6. The aggregate composition according to claim 5 wherein the artificial sweetening agent is at least one member selected from the group consisting of cyclamate salt and saccharin salt.

7. The aggregate composition according to claim 6 wherein the aggregate contains from about 65 to about 125 parts by weight cyclamate salt, 90 parts by weight citric acid, 60 to 135 parts by weight fumaric acid and from about 5 to about 12 parts by weight saccharin salt.

8. The aggregate according to claim 7 wherein the cyclamate salt is calcium cyclamate and the saccharin salt is calcium saccharin.

9. A method for the manufacture of an edible, porous, cold water-soluble aggregate composition, said method consisting essentially of:

(a) moistening a random uniform admixture consisting essentially of from at least 1 to about 9 parts by weight fumaric acid particles having a maximum particle size of 75 microns wherein the fumaric acid particles are coated with from about 0.01 to about 0.1 weight percent of a dialkyl ester of a sodium sulfosuccinate with the dialkyl groups containing from 7 to 14 carbon atoms inclusive, 3 parts by weight citric acid particles having a maximum particle size of 100 microns and an artificial sweetening agent;

(b) bringing the particles in contact with one another and causing said moistened particles to permanently adhere together in the form of a light, porous, random aggregate of a size substantially greater than the particles; and, (c) removing excess moisture from the aggregate to provide a free-flowing aggregate composition.

10. The method according to claim 9 wherein the moistening of said particles is accomplished by dispersing them in a humid atmosphere and condensing moisture therein and substantially all the citric acid particles have a particle size of less than 80 microns with at least a major portion of the citric acid particles being less than 10 microns in size.

11. The method according to claim 10 wherein 90 parts by weight anhydrous citric acid particles and from 60 to about 135 parts by weight fumaric acid particles are moistened.

12. The method according to claim 11 wherein the moisture control of the admixture is increased by not more than 3.5 percent.

13. The method according to claim 12 wherein the dialkyl ester of a sodium sulfosuccinate is a dioctyl sodium sulfosuccinate.

14. The method according to claim 13 wherein the moistening of said particles is accomplished by condensing moisture therein under conditions substantially equivalent to dispersing the particles at about 80° F. in a humid atmosphere having a dry bulb temperature of 255° to 275° F. and a wet bulb temperature of 155° to 165° F.

15. The method according to claim 14 wherein the dialkyl ester of a sodium sulfosuccinate is di-(2-ethylhexyl)-sodium sulfosuccinate and the random admixture contains from about 2.5 to about 25 parts by weight flavoring agent and from about 0.01 to about 5 weight percent coloring agent.

16. The method according to claim 15 wherein the weight ratio of fumaric acid particles to anhydrous citric acid particles ranges from about 2:3 to about 3:2.

17. The method according to claim 16 wherein the artificial sweetening agent particles comprise from about 65 to about 125 cyclamate salt particles and from about 5 to about 12 parts by weight saccharin salt particles.

References Cited

UNITED STATES PATENTS

| | | | |
|---|---|---|---|
| 2,995,773 | 8/1961 | Gidlow et al. | 99—141 |
| 3,011,897 | 12/1961 | Grosvenor | 99—141 |
| 3,143,428 | 8/1964 | Reimers et al. | 99—141 |
| 3,151,986 | 10/1964 | Van Ness | 99—78 |
| 3,351,471 | 11/1967 | Demler et al. | 99—78 |
| 3,359,119 | 12/1967 | Milton | 99—78 |
| 3,370,956 | 2/1968 | Reitman et al. | 99—78 |
| 3,262,788 | 7/1966 | Swanson et al. | 99—199 |
| 3,433,644 | 3/1969 | Ganske et al. | 99—78 |

LIONEL M. SHAPIRO, Primary Examiner

W. C. LAWTON, Assistant Examiner

U.S. Cl. X.R.

99—199